United States Patent [19]

Wehrmann

[11] 4,037,436
[45] July 26, 1977

[54] TOE CONSTRUCTION AND METHOD FOR SEAMLESS HOSIERY PRODUCTS

[75] Inventor: Nicholas Wehrmann, Wilkesboro, N.C.

[73] Assignee: Ithaca Textiles, Inc., Wilkesboro, N.C.

[21] Appl. No.: 609,783

[22] Filed: Sept. 2, 1975

[51] Int. Cl.² .................... A41B 11/02; D04B 9/46
[52] U.S. Cl. ........................................ 66/186; 2/241; D2/338
[58] Field of Search ............... 66/182, 185, 186, 187, 66/184, 178 R; 2/241; D2/335–342

[56] References Cited

U.S. PATENT DOCUMENTS

| 1,694,324 | 12/1928 | Kaplan | 2/241 |
|---|---|---|---|
| 2,305,218 | 12/1942 | Hemmerich | 66/184 X |
| 2,825,215 | 3/1958 | Buckreus | 66/178 R X |
| 3,262,288 | 7/1966 | Burd | D2/337 X |
| 3,338,071 | 8/1967 | Pons et al. | D2/338 X |
| D. 118,754 | 1/1940 | Moyer | D2/338 |
| D. 167,323 | 7/1952 | Schletter | D2/341 |
| D. 168,743 | 2/1953 | Henk | D2/338 |

Primary Examiner—Mervin Stein
Assistant Examiner—A. M. Falik
Attorney, Agent, or Firm—B. B. Olive

[57] ABSTRACT

An improved toe construction for women's seamless hosiery, panty hose, anklets, and the like, is obtained by knitting, trimming and joining the toe portion in such a manner as to provide a generally arc-shaped, reinforced area in at least the top portion of the toe or in both top and bottom toe portions to maximize the nude look, minimize the amount of reinforced area in the toe, and to expedite the toe closure trimming and joining operation.

3 Claims, 9 Drawing Figures

U.S. Patent July 26, 1977 4,037,436
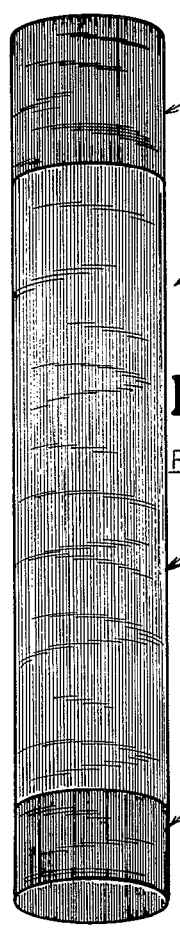
FIG. 1 PRIOR ART
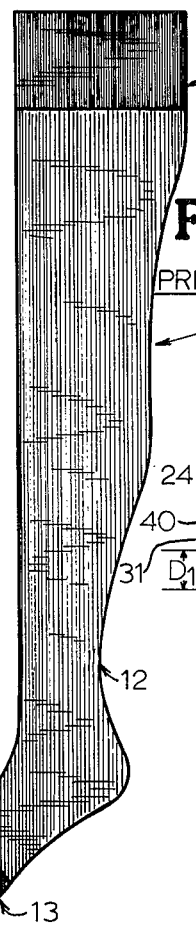
FIG. 2 PRIOR ART
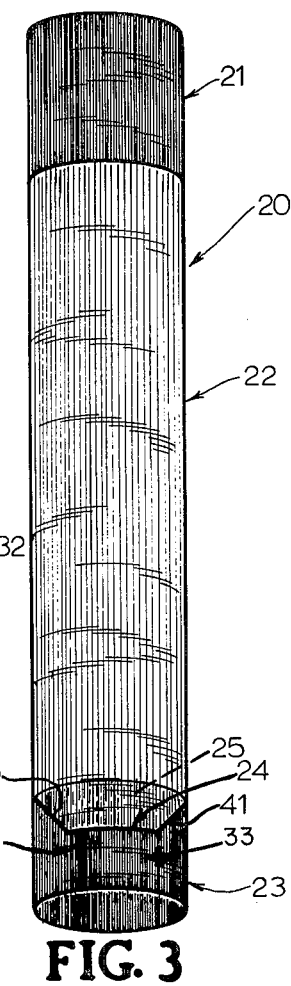
FIG. 3
FIG. 5
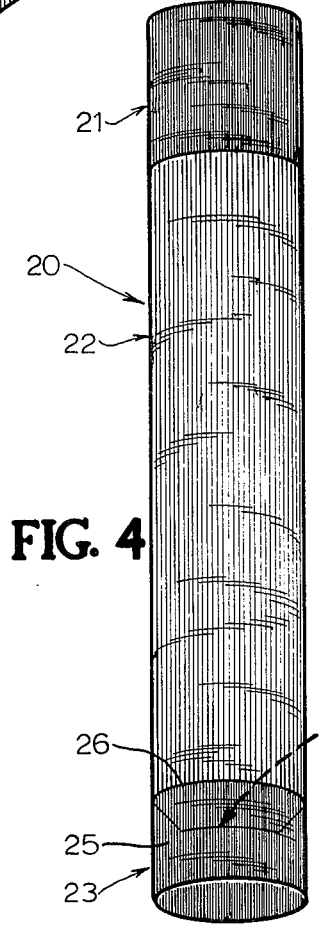
FIG. 4
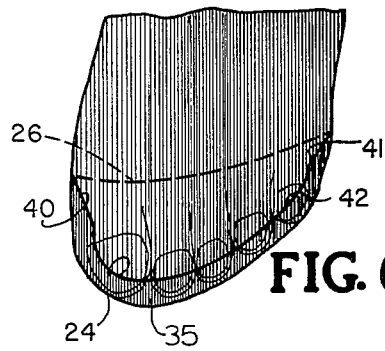
FIG. 6
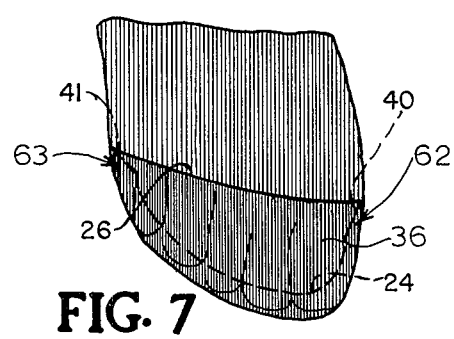
FIG. 7
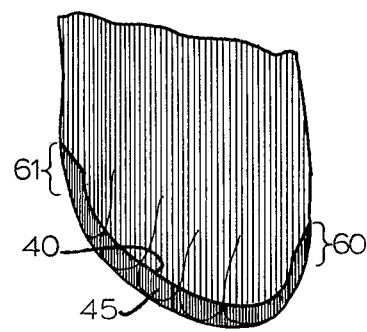
FIG. 8
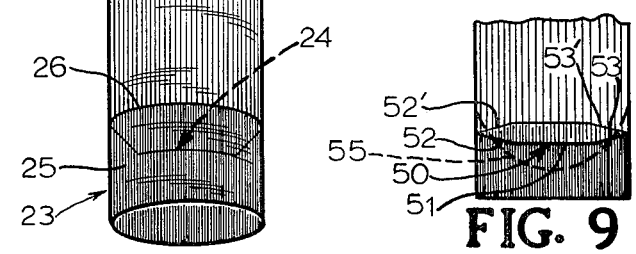
FIG. 9

TOE CONSTRUCTION AND METHOD FOR SEAMLESS HOSIERY PRODUCTS

BACKGROUND OF THE INVENTION

1. Field of the Invention:

The invention relates to hosiery constructions and more specifically to toe constructions and to methods of forming toe constructions in women's seamless hosiery, panty hose, anklets, and the like.

2. Description of the Prior Art:

It has been the practice in the manufacture of women's seamless hosiery to knit a seamless tube having welt, leg and foot portions formed of body yarn and to terminate the toe portion with a relatively wide band of courses of heavier or additional reinforcing threads so that the toe, as distinct from the foot and leg portions of the hosiery, inherently requires a heavier appearance. U.S. Pat. No. 2,699,056 illustrates a type of such reinforcement. With an increasing demand for a maximum nude appearance in the hosiery, one solution has been to avoid reinforcing all together in the toe portion. However, such a toe construction is easily damaged due to the amount of wear impressed in the toe portion during normal use. Another solution has been to use finer denier reinforcing threads but this has not provided a satisfactory solution for achieving a maximum nude look in the finished toe.

It can also be observed that, according to the present practice of putting a relatively wide band of reinforcement completely around the top and bottom portions of the toe portion of the typical woman's hose, substantially more reinforced area is provided than is actually needed; thus, conventional toe constructions actually use more reinforcing thread than is needed for reinforcing the greatest points of wear at the ends and sides of the toe extremities of the wearer. Panty hose and anklets are similar.

SUMMARY OF THE INVENTION

According to the present invention as applied to women's hose as an example, such hose in the toe portion are provided with a reinforced area in the top tip portion of the toe or in both the top tip portion and the bottom tip portion of the toe which, in either case, appears as a relatively narrow arc-shaped band of partial course reinforcement. This construction is achieved by initially knitting the toe portion so that at least the portion of the toe construction which is intended to cover the top of the toes of the wearer will have the inner edge of the reinforced area knitted to assume a somewhat arc-shaped as worn and the outer edge of this reinforced area, during the trimming and toe closing operation, is trimmed and joined in such a manner that the reinforced area is produced as a narrow arc-shaped band in the finished product as worn so that only the tops of the outer extremities of the toes of the wearer are covered by reinforced fabric while allowing for a longer length of the sides of the toe extremities to be covered and for the bottom of the toe extremities to be covered either by a wide uniform width band of reinforcement as done conventionally or by a narrow arc-shaped band as with the top portion of the toe construction. The length of the courses incorporating the reinforcing threads with the full courses of body yarn threads in the toe portion can be regulated in a manner known to the art. With either embodiment, less reinforcement is required than with conventional practices and the area of reinforcement is concentrated at the greatest point of wear and stress, whether in hosiery, panty hose, or the like.

DESCRIPTION OF THE DRAWINGS

FIG. 1 is a perspective view of a typical seamless knitted tube used in women's hosiery and is shown prior to having the toe joined, e.g., by sewing or fusing, and trimmed in the closure operation according to prior art.

FIG. 2 illustrates a prior art woman's hose after the toe has been joined and trimmed.

FIG. 3 shows a seamless knitted tube and toe portion of hosiery made according to the invention in a first embodiment and is viewed from the side of the toe portion which fits above the foot.

FIG. 4 is a view of the same seamless knitted tube shown in FIG. 3 but viewing the toe portion from the side of the toe portion which fits below the foot.

FIG. 5 illustrates the toe portion of the hose of FIG. 3 folded flat preparatory to being joined and trimmed along a trim line indicated in dashed lines according to the invention.

FIG. 6 is a view of the top of the toe portion of a woman's hose made according to the invention in the first embodiment.

FIG. 7 is a view similar to FIG. 6 but showing the bottom or underside of the toe portion of a woman's hose made according to the invention in the first embodiment.

FIG. 8 is a view similar to FIG. 7 but showing the bottom of the toe portion of a woman's hose made according to the invention in a second embodiment.

FIG. 9 is a view similar to FIG. 5 but showing an alternate trim line.

DESCRIPTION OF THE PREFERRED EMBODIMENT

Prior to describing the preferred embodiment, reference is made to FIGS. 1 and 2 illustrating the typical prior art construction which uses women's hose as an example of various products to which the invention is applicable. In this regard, it may be noted in FIG. 1 that a typical woman's hose is made from an openended seamless tube 10 with a welt portion 11, a leg portion 12, and toe portion 13. It should be particularly noted that the toe portion 13 in FIG. 1 appears as a relatively wide circular band of reinforced fabric. Such reinforcement is achieved during the knitting operation simply by supplementing the base or body thread with a suitable reinforcing thread or by substituting a heavy thread as the base thread. The tube 10 shown in FIG. 1 may be heat set into the shape illustrated in FIG. 2 and the toe portion 13 is closed by a sewing, fusing, and similar joining operation and by a trimming operation.

In the described prior art construction, it can be seen that the reinforced area of toe portion 13 is a relatively wide band and typically encloses the entire toes of the wearer. It may also be observed in actual practice that the basic reason for having reinforcing the toe portion 13 is primarily to reinforce the tip end and side portions of the toe portion of the hose such as indicated at 14 in FIG. 2. This is actually where the greatest wear takes place. Thus, a substantial portion of the toes of the wearer is unnecessarily covered which detracts from the nude look so often desired in women's fashions. The same can be said for panty hose, anklets, and the like.

The present invention is illustrated in three embodiments. FIGS. 3–7 represent the first embodiment, FIG.

8 illustrates a second embodiment, and FIG. 9 illustrates a third embodiment. According to the illustrative embodiments of the present invention, the hose is initially knit as an open-ended seamless tube 20 with a conventional welt portion 21, leg portion 22 and a toe portion 23. The finished hose may be heat set and formed, as previously explained. The present invention is concerned only with the manner in which the toe portion 23 of the hose is initially knit and reinforced prior to the joining and trimming operation which closes the toe and is further concerned with the joining and trimming operation which follows the knitting. The invention is particularly useful when the joining is by use of a sewing machine which simultaneously sews and trims the toe portion.

It has already been mentioned in connection with FIGS. 1 and 2 that in the seamless tube 10 used to make conventional women's hose, the typical reinforced area 13 (FIG. 1) provides a relatively wide reinforced circular band of reinforcement around the entire circumference of the terminal end of the tube 10 and which is later closed by trimming and joining to provide a toe. Such a construction in the end product, FIG. 2, causes the entire length of the wearer's toes to be covered and which detracts from the desired nude look. In contrast, as illustrated in FIGS. 3 and 4, in the first embodiment of the present invention, the side of the tube 20 having toe portion 23 and which is intended to cover the top of the wearer's toes has the reinforced area 33 knit so that the inner edge 24 of the reinforced area 33 is formed in a substantially semi-hexagonal or arc-shape, as best seen in FIG. 3. The opposite side of the reinforced area of the toe portion covers the bottom of the wearer's toes and, as shown in FIG. 4, is knit as a rectangular band 25 with a straight inner edge 26 which in appearance and construction on the bottom of the hose toe resembles the typical reinforced band found in the prior art hosiery illustrated in FIGS. 1 and 2.

The first aspect of the invention, thus, is concerned with the manner of knitting the toe portion so that instead of having a relatively wide reinforced band circumscribing the terminal or toe portion of the tube which is intended to form the hosiery product, such band is knit, with respect to the first embodiment of the invention, as illustrated in FIGS. 3 and 4. In another aspect of the invention, the toe is trimmed and joined by following an arcuate trim line generally parallel to edge 24 as indicated in dashed lines by the numeral 30 in FIG. 5. Preparatory to this trimming-joining operation on a conventional trimming-sewing machine, the hose is flattened, the inner edge 24 is symmetrically positioned as in FIG. 5 and the outer edge 27 of the tube 20 is aligned as indicated. It should be understood that this trim line is not a fixed line but is a visual line observed by the sewing machine operator. In actual practice, it has been found that the operator can very quickly manipulate a tube knit as shown in FIGS. 3 and 4 so that the points 31, 32 of the reinforced area shown in FIG. 5 can be used to symmetrically position edge 24 as indicated in FIG. 5. Once this alignment has been obtained visually by the sewing machine operator, the operator with little experience can follow a trim line closely approximating line 30 indicated in FIG. 5 and along which joining takes place. It may be noticed that trim line 30 preserves the dimensions $D_1$, $D_2$ shown in FIG. 5 which allows the finished hose to be worn so that the same effectively engages only the outer end toe extremities of the wearer and so that the outer side of the outer toes of the wearer are covered by fabric which does not include the join. The joining and trimming operation can also be performed by available machines which operate on the toe fabric in a clamped position and which can be programmed to trim and join the fabric on a fixed arcuate line as described.

The tube 20, provides a finished product which may be heat set as illustrated in FIG. 2 but with an improved toe construction. In the finished product, with respect to the first embodiment, the toe construction as worn provides, on its upper exposed surface, a reinforced area of narrow arc-band shape and only over the tops of the toes, as illustrated at 35 in FIG. 6. On its lower exposed surface, according to the first embodiment, a relatively wide reinforced band is retained as indicated at 36 in FIG. 7 which shows the bottom surface of the toe portion reinforced area as worn according to the first embodiment. Since hosiery, panty hose, anklets, and the like, having toe constructions of the type involved with the invention are often worn with open toe shoes, sandles, and the like, it can readily be seen that a vastly improved nude look is obtained with the improved construction and method of the invention and with a significant saving in reinforcing thread.

In an alternate embodiment, the bottom surface of the toe portion is reinforced as illustrated in FIG. 8. In this second embodiment, the hose is knit so that both sides of the toe portion terminate with reinforced areas having the narrow arc-band appearance of the reinforced area in FIG. 3. That is, in the alternative embodiment, both the top and bottom portions of the toe portion of the hosiery have a semi-hexagonal or arch-shaped inner edge such as represented by the upper inner edge 24 in FIG. 3 and the lower inner edge 40 in FIG. 8. Thus, when worn by the wearer, the bottom of the foot, in the case of the second embodiment, appears with a narrow arc-like reinforcing band 45 as illustrated in FIG. 8. Thus, when the wearer is not wearing shoes, as for example when resting on a lounge chair, both the bottom and tops of the toes are covered only with a minimum amount of reinforcing fabric and only over the outer extremities of the wearer's toes. Thus, the desired nude look is obtained in both the top and bottom surface portions in the reinforced area of the improved toe construction while the ends and sides of the toes in the outer extremities are nevertheless still protected with reinforced fabric and it is these toe surfaces which actually cause the greater amount of abusive wear.

In knitting, according to the invention, it has been found that if the inner edge 24 is knit in the semi-hexagonal or general arc-shape indicated, that is, with inwardly tapering boundary lines 40, 41 and a straight connecting line 42 (as shown in FIGS. 3 and 5), and if the hose is trimmmed on an arcuate line which runs generally parallel to edge line 24 as with trim line 30 in FIG. 5, the edge line 24, when the hose is worn, will stretch into an arc-like shape that parallels the arc line of the toes. Such an "arc" in this sense is, of course, not a true arc with all points on the arc having a common radius. The intent of the invention is thus to define the inner edge boundary of the reinforced area in a general arc-shape of semi-hexagonal shape of this kind so that when the toe is trimmed along a more nearly true arc line, as indicated in FIG. 5, the toe as worn provides a narrow, arc-shaped reinforced area over the upper toe extremities, as in the first embodiment, over both upper and lower toe extremities as in the second embodiment. It should, of course, be borne in mind that joining, e.g., by sewing, is performed immediately adjacent the trim line.

FIG. 9 is a view of the folded toe construction preparatory to joining and trimming and is similar to FIG. 5 but in a third embodiment. In this third embodiment, the inner edge line 50 of the reinforced area consists of a short straight line component 51, two slightly angled line components 52, 53 as viewed from the top of the folded toe portion and two short line continuations 52', 53' which should be considered as being on the back of the folded toe portion. In this third embodiment, the arcuate trim line 55 can be viewed as actually terminating at its ends in a sheer, i.e., unreinforced fabric, and the inner edge line of the reinforced area can be viewed as extending across the top side of the toe portion and terminating on the bottom side of the toe portion. When made according to the third embodiment, the top outer toe portions as indicated at 60, 61 in FIG. 8 would become sheer, i.e., not reinforced, as would the bottom outer toe portions in the areas indicated by 62, 63 in FIG. 7. Thus, the third embodiment may be employed to provide a narrow band of reinforcement over the outer extreme ends of all of the toes of the wearer while leaving the outer sides of the toe extremities covered in sheer fabric. In contrast, the first embodiment may be employed with the same effect but provide reinforced fabric over the outer sides of the toe extremities. The invention thus offers substantial versatility in its application to a wide range of seamless toe constructions and at a substantial reduction in cost.

What is claimed is:

1. In a seamless circular knit product such as hosiery, panty hose anklets, and the like, having a tubular seamless knit foot portion formed of courses knit of body yarn and terminating in an initially open-ended toe portion, said toe portion open end being closed by stitching along a trim line substantially arcuate in shape in the relaxed fabric to provide upper and lower sides thereof, the upper side when worn being adapted to rest above and the lower side to rest below the toes of the wearer, said upper side including courses and partial courses of reinforcing thread of selected length designed to provide a reinforced area having the outer edge thereof defined by said stitched trim line and having the inner edge thereof defined by a boundary line which in the state of the toe portion fabric being relaxed follows a series of connected substantially straight lines and in the worn stretched state assumes a substantially arcuate shape and with a major portion thereof being substantially parallel to said arcuate stitched trim line, said inner edge define by said lines following a semi-hexagonal shape in the relaxed fabric state and adapted to assume an arcuate shape in the stretched fabric shape, said reinforcing thread courses being formed such that said toe portion when worn provides a narrow curved band of reinforced fabric limited to the upper outer extremities of the toes of the wearer, a selected width band of reinforced fabric over the lower extremities of the toes of the wearer and outer edge reinforced portions adapted when worn to provide reinforcement over the ends of all the toes of the wearer.

2. A seamless knit product as claimed in claim 1 having on the lower side of said selected width band of reinfoced fabric over the lower extremities of the toes of the wearer formed and defined in the same manner as said upper side reinforced area.

3. A seamless knit product as claimed in claim 1 having said trim line directed to terminate in unreinforced fabric wherein at least portions of the outer extreme sides of the toes of the wearer may be covered by seamless fabric not encompassing said stitching.

* * * * *

UNITED STATES PATENT OFFICE
CERTIFICATE OF CORRECTION

Patent No. 4,037,436          Dated July 26, 1977

Inventor(s) Nicholas Wehrmann

It is certified that error appears in the above-identified patent and that said Letters Patent are hereby corrected as shown below:

Col. 1, line 52, "arc-shaped" should read --arc-shape--.

Col. 2, line 2, "point" should read --points--.

Col. 2, line 43, "openended" should read --open-ended--.

Col. 2, line 53, "and" should read --or--.

Col. 2, line 59, After the word "reinforcing" insert --in--.

Col. 4, line 62, The first appearance of "of" should read --or--.

Col. 4, line 66, Before the word "over" insert --or--.

Col. 6, line 15, "define" should read --defined--.

Col. 6, line 28, "reinfoced" should read --reinforced--.

*Signed and Sealed this*

*Third* Day of *January 1978*

[SEAL]

Attest:

RUTH C. MASON      LUTRELLE F. PARKER
*Attesting Officer*     *Acting Commissioner of Patents and Trademarks*